United States Patent
Hayashi

(10) Patent No.: US 7,917,667 B2
(45) Date of Patent: Mar. 29, 2011

(54) METHODS AND APPARATUS FOR ALLOCATING DMA ACTIVITY BETWEEN A PLURALITY OF ENTITIES

(75) Inventor: Atsushi Hayashi, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 37 days.

(21) Appl. No.: 11/525,404

(22) Filed: Sep. 22, 2006

(65) Prior Publication Data

US 2008/0126601 A1    May 29, 2008

(51) Int. Cl.
G06F 13/28 (2006.01)
G06F 5/00 (2006.01)

(52) U.S. Cl. .................. 710/22; 710/28; 710/40
(58) Field of Classification Search .......... 710/22, 710/28, 40
See application file for complete search history.

(56) References Cited

U.S. PATENT DOCUMENTS

| | | | |
|---|---|---|---|
| 6,070,212 A * | 5/2000 | Yasuda et al. | 710/107 |
| 6,526,491 B2 | 9/2002 | Suzuoki et al. | |
| 7,213,084 B2 * | 5/2007 | Ogilvie et al. | 710/22 |
| 7,506,123 B1 * | 3/2009 | Labour et al. | 711/165 |
| 2002/0129181 A1* | 9/2002 | Lahiri et al. | 710/113 |
| 2003/0005524 A1* | 1/2003 | Hayes et al. | 8/159 |
| 2006/0048150 A1* | 3/2006 | Huang et al. | 718/100 |
| 2006/0155893 A1* | 7/2006 | Bottemiller et al. | 710/27 |

* cited by examiner

*Primary Examiner* — Alford W Kindred
*Assistant Examiner* — Zachary K Huson
(74) *Attorney, Agent, or Firm* — Matthew B. Dernier, Esq.; Gibson & Dernier LLP

(57) ABSTRACT

A system and method are disclosed which may include providing a processor operable to request an ongoing processor operation DMA communication task; providing at least one data transfer device operable to request a defined-content DMA communication task; providing a memory operable to conduct DMA communication with the processor and the at least one data transfer device over at least one data bus, the DMA communication having a bandwidth; and allocating the DMA communication bandwidth between the processor operation DMA communication task and the defined-content DMA communication task.

19 Claims, 10 Drawing Sheets

US 7,917,667 B2

METHODS AND APPARATUS FOR ALLOCATING DMA ACTIVITY BETWEEN A PLURALITY OF ENTITIES

BACKGROUND OF THE INVENTION

The present invention relates to methods and apparatus for allocating Direct Memory Access (DMA) communication bandwidth between competing entities within a computing system.

Real time, multimedia applications are becoming increasingly important. These applications require extremely fast processing speeds, and data transfer speeds, such as many thousands of megabits of data per second. While some processing systems employ a single processor to achieve fast processing speeds, others are implemented utilizing multi-processor architectures. In multiprocessor systems, a plurality of sub processors can operate in parallel (or at least in concert) to achieve desired processing results.

In recent years, there has been an insatiable desire for faster computer processing data throughputs because cutting edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results.

In some processing systems, DMA techniques are employed where the computer architecture allows data to be sent directly between a device and a memory without involving any microprocessor(s) in the data transfer. The architecture usually includes a memory controller that receives data transfer commands from the device(s) of the system to cause the transfer of data. A conventional DMA command may specify a data block size, a starting virtual address within the system memory from/to which data are to be transferred, and a start address of the device to/from which data are to be transferred. In this manner, data may be rapidly transmitted between a specified device and a specified memory without burdening a processor.

Where only one device and/or one memory seek access to a data bus to conduct DMA data transfer, the above process is effective. However, a problem may arise where several devices or entities seek DMA data transfers, or DMA communication tasks, for the same, or at least for overlapping, time periods. This is particularly true where different levels of urgency are associated with different respective DMA communication tasks. If the DMA communication task that starts first proceeds to completion without interruption, a more urgent DMA communication task may experience an unacceptable processing delay. Accordingly, there is a need in the art to allocate DMA communication bandwidth among competing devices and/or among competing DMA communication tasks.

SUMMARY OF THE INVENTION

According to one aspect, the invention provides an apparatus that may include a processor operable to request a processor operation DMA communication task; at least one data transfer device operable to request a defined-content DMA communication task; a memory operable to enable DMA communication with the processor and the at least one data transfer device over at least one data bus, the DMA communication having a bandwidth; and an arbitration system operable to allocate the DMA communication bandwidth between the processor operation DMA communication task and the at least one defined-content DMA communication task.

According to another aspect, the invention provides a method that may include providing a processor, operable to request a processor operation DMA communication task; providing at least one data transfer device operable to request a defined-content DMA communication task; providing a memory operable to conduct DMA communication with the processor and the at least one data transfer device over at least one data bus, the DMA communication having a bandwidth; and allocating the DMA communication bandwidth between the processor operation DMA communication task and the defined-content DMA communication task.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
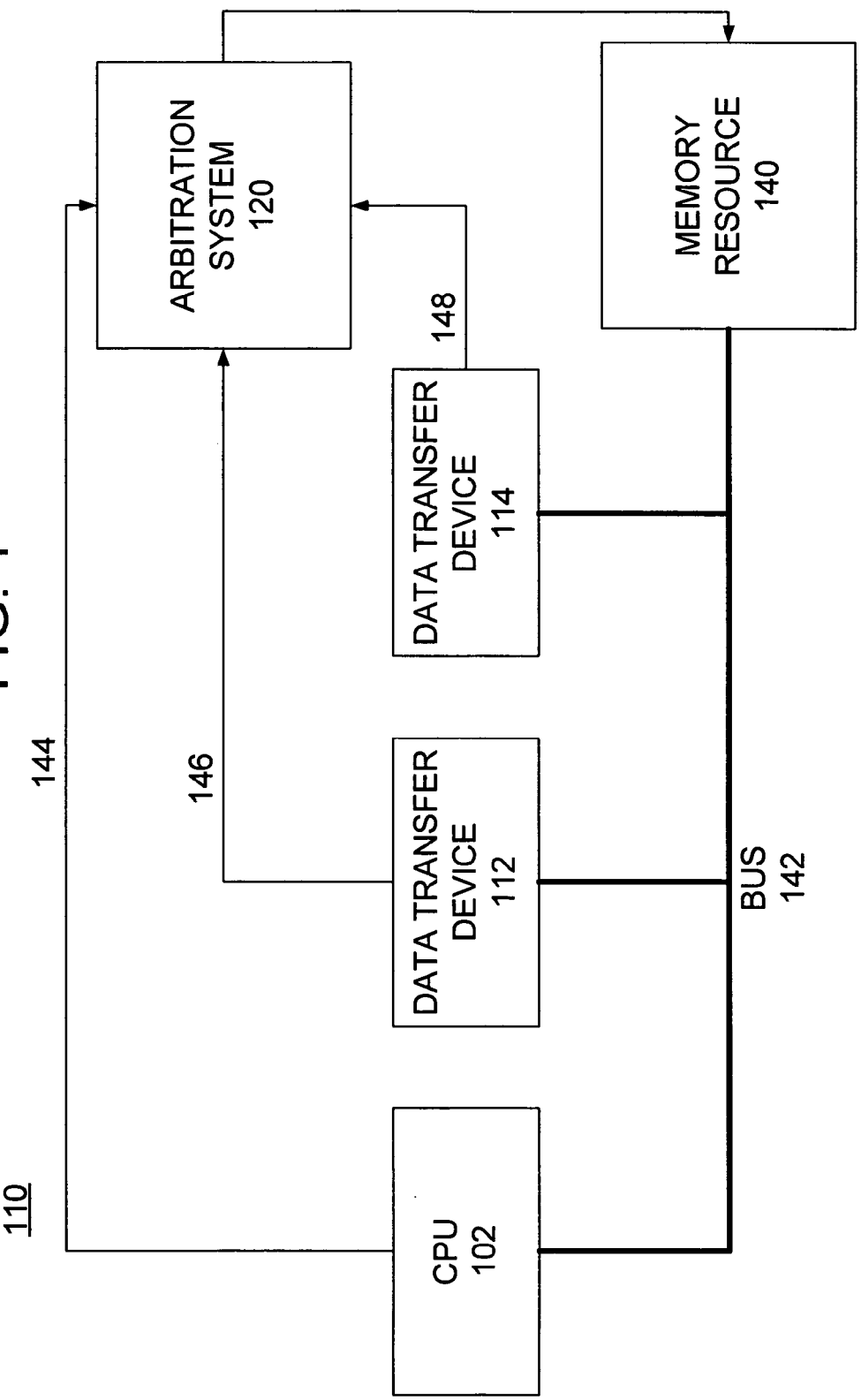
FIG. 1 is a block diagram of a computer network enabling arbitration of DMA communication bandwidth among two or more competing DMA communication tasks in accordance with one or more embodiments of the present invention.

FIG. 1 is a block diagram of a computer network 110 enabling arbitration of DMA communication bandwidth among two or more competing entities in accordance with one or more embodiments of the present invention.

Computer network 110 may include CPU (Central Processing Unit) 102, data transfer device 112, data transfer device 114, arbitration system 120, memory resource 140, DMA data bus 142, and DMA command buses 144, 146, and 148.

In one or more embodiments, CPU 102 may be a processor 102 that may be implemented utilizing any of the known technologies that are capable of requesting data from a system memory (not shown), and manipulating the data to achieve a desirable result. For example, the processors 102 may be implemented using any of the known microprocessors that are capable of executing software and/or firmware, including standard microprocessors, distributed microprocessors, etc. By way of example, the processors 102 may be graphics processors that are capable of requesting and manipulating data, such as pixel data, including gray-scale information, color information, texture data, polygonal information, video frame information, etc. CPU 102 may be incorporated within a multiprocessor network.

Data transfer devices 112 and 114 may be processors, memory devices, or other devices suitable for reading and/or writing blocks of data employing DMA techniques. Data transfer devices 112 and 114, may of course include combinations of one or more devices of the same or different type or construction.

Data transfer devices 112 and 114 may be operable to request and conduct defined-content DMA communication tasks with memory 140 and/or other storage devices. Defined-content DMA communication tasks may include read or write operations. The types of DMA communication conducted by data transfer devices 112 and 114 and by CPU 102 are discussed further in connection with FIG. 2, below.

Arbitration system 120 may include one or more systems and methods for allocating bandwidth between devices competing for DMA communication bandwidth such as CPU 102, data transfer device 112, and data transfer device 114. Various embodiments of arbitration system 120 are discussed in greater detail later in this disclosure.

Memory resource (memory) 140 may be any type of data storage device such as a Dynamic Random Access Memory (DRAM), Static Random Access Memory (SRAM), or other type of digital storage device.

In one or more embodiments, computer network 110 may include one DMA command bus (144, 146, 148) for each entity requesting DMA communication to/from memory 140. In one or more alternative embodiments, separate DMA data buses could be deployed for each device that communicates with memory 140.

DMA Data Use and Communication in Differing Operations

In order to assist in understanding one or more embodiments of the present invention, a description will now be provided of the DMA communication needs of CPU 102 which may conduct ongoing CPU operation DMA communication tasks and the needs of data transfer devices 112 and 114 which may conduct defined-content DMA communication tasks. The various devices may compete for access to the DMA communication bandwidth available from memory 140 over data bus 142, whether such bandwidth is available over the single data bus 142, or a plurality of separate buses.

These devices competing for DMA communication bandwidth may share a single DMA data bus but preferably have separate DMA command buses for communication with memory 140.

One use of DMA communication herein is to serve the needs of the ongoing operation for CPU 102 and/or other CPUs. The operation of CPU 102 may experience highly variable and rapidly shifting DMA communication bandwidth requirements, many of which are difficult or impossible to predict in advance. The unpredictability the DMA communication needs of the ongoing operation of CPU 102 may extend to both the quantity of data requested to be transmitted and the degree of urgency of the requested communication. In one or more embodiments herein, the degree of urgency may be expressed in the form a priority level, which is discussed in greater detail later herein.

Generally, CPU 102 operates to set a priority level for each requested DMA communication task in accordance with the circumstances thereof. This type of DMA communication need may therefore benefit from a flexible approach to allocating DMA communication bandwidth.

Because data needed by CPU 102 may be accessible by other entities, there is a need to ensure data coherency before conducting DMA communication. Accordingly, a DMA snoop procedure may be undertaken first, and a requested DMA data communication task may proceed thereafter, if data coherency is found to be present.

Another use for DMA communication contemplated herein is for defined-content DMA communication tasks. In one or more embodiments, a defined-content DMA communication task contemplates DMA data transfer operations defining a known and fixed quantity of data to be transferred. The transfer of image data for a television display is one example of such a data transfer operation. For this type of DMA communication, the total quantity of data is generally known. Since image data for television display purposes is generally stored in one or more exclusive areas of memory 140, or other memory devices, checking for data coherency is generally not needed. It is noted that the present invention is not limited to defined-content DMA communication involving television display data.

In one or more embodiments, there is generally a real-time deadline for completing a defined-content DMA communication task. Accordingly, the level of urgency and corresponding priority level of this type of communication task is generally a function of the processing time needed to complete the communication task and the time remaining before expiration of the real-time deadline.

Figure 2:
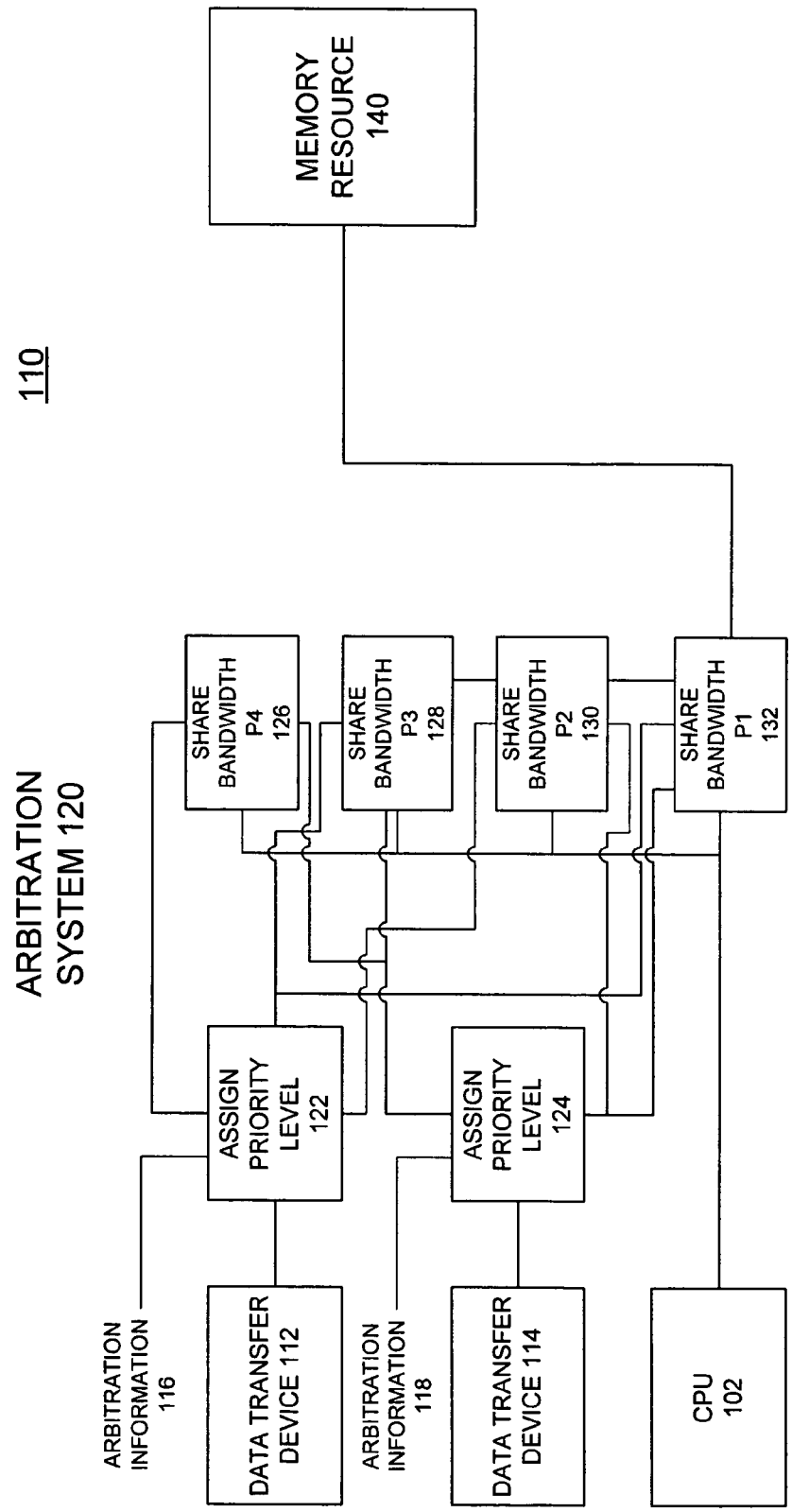
FIG. 2 is block diagram of a portion of the computer network of FIG. 1 including an arbitration system in accordance with one or more embodiments of the present invention.

FIG. 2 is block diagram of a portion of the computer network 110 of FIG. 1 in accordance with one or more embodiments of the present invention.

In one or more embodiments, arbitration system 120 of FIG. 1 corresponds to the function blocks of FIG. 2 disposed in between data transfer devices 112 and 114 and CPU 102 at the left and memory resource 140 at the right. However, arbitration system 120 is not limited to the embodiment thereof shown in FIG. 2.

As shown in FIG. 2, computer network 110 may include data transfer devices 112 and 114, CPU 102; priority level assignment blocks 122 and 124; priority-level specific bandwidth sharing circuits 126 (priority level 1), 128 (priority level 2), 130 (priority level 3), and 132 (priority level 4); and memory 140. For the sake of simplicity, the command and data buses shown in FIG. 1 are omitted in FIG. 2. The combination of the four bandwidth sharing circuits 126, 128, 130, and 132 may be referred to as a bandwidth sharing system.

By way of overview of the embodiment of FIG. 2, the connections between the depicted functional blocks are described in this section. Data transfer devices 112 and 114 are coupled to priority level assignment circuits 112 and 124, respectively. It is noted here that CPU 102 may internally determine the priority level of its DMA communication tasks.

Accordingly, in one or more embodiments, a priority level assignment circuit may be omitted for CPU 102.

In one or more embodiments, each of priority level assignment circuit 122, priority level assignment circuit 124, and CPU 102 may be coupled to all four depicted bandwidth sharing circuits 126, 128, 130, and 132. Bandwidth sharing circuit 132 may connect to memory resource 140. Bandwidth sharing circuit 132 is preferably operable to convey to memory 140 the entity or entities currently entitled to DMA communication bandwidth along with each entity's share of this bandwidth. Arbitration in accordance with one or more embodiments of present invention proceeds is discussed below.

In one or more embodiments, CPU 102 and priority level assignment circuits 122 and 124 divide requested DMA communication tasks from the respective requesting entities into four priority levels. However, it is noted here that the present invention is not limited to the use of four priority levels, and that fewer or more than four priority levels of DMA communication may be employed.

Various embodiments of the priority level assignment circuits 122 and 124 are discussed in connection with FIGS. 4-6, below. However, the present invention is not limited to the use of the specific priority level assignment circuits shown in FIGS. 4-6 and described in connection therewith.

In one or more embodiments, arbitration system 120 allocated DMA communication bandwidth to the highest priority DMA communication task that is pending at any given moment. Thus, arbitration system 120 preferably first processes DMA communication tasks having priority level 1. If a DMA communication task request is present at priority level 1, that request may be serviced first. If multiple tasks are present at priority level 1, the DMA communication bandwidth may be shared between the multiple tasks. The DMA communication bandwidth within a given priority level may be shared equally or unequally among the competing DMA communication tasks depending upon the needs of each task.

In one or more embodiments, once all pending DMA communication tasks at priority level 1 have been serviced, arbitration system 120 may transition to the next lower priority level to service any pending DMA communication tasks there. Arbitration system 120 may skip any priority levels at which no DMA communication tasks are pending.

For example, upon concluding servicing a DMA communication task at priority level 1, arbitration system 120 directs its attention to the sharing circuit 130 for priority level 2. In this example, no DMA communication task is pending at priority level 2. Accordingly, arbitration system 120 transitions to the sharing circuit 128 for priority level 3.

In this example, it is assumed that CPU 102 and data transfer device 112 simultaneously have DMA communication tasks pending at priority level 3. Accordingly, in one or more embodiments, the DMA communication bandwidth is shared equally between these two tasks until one or both tasks is completed.

Thus, arbitration system 120 preferably continues to service the highest-priority level DMA communication task(s) pending at any given moment. Under this arrangement, it is possible that a priority level 3 DMA communication task could be interrupted to service a newly arrived DMA communication task having a priority level of 1 or 2. A more detailed example is discussed below in connection with FIG. 3.

Figure 3:
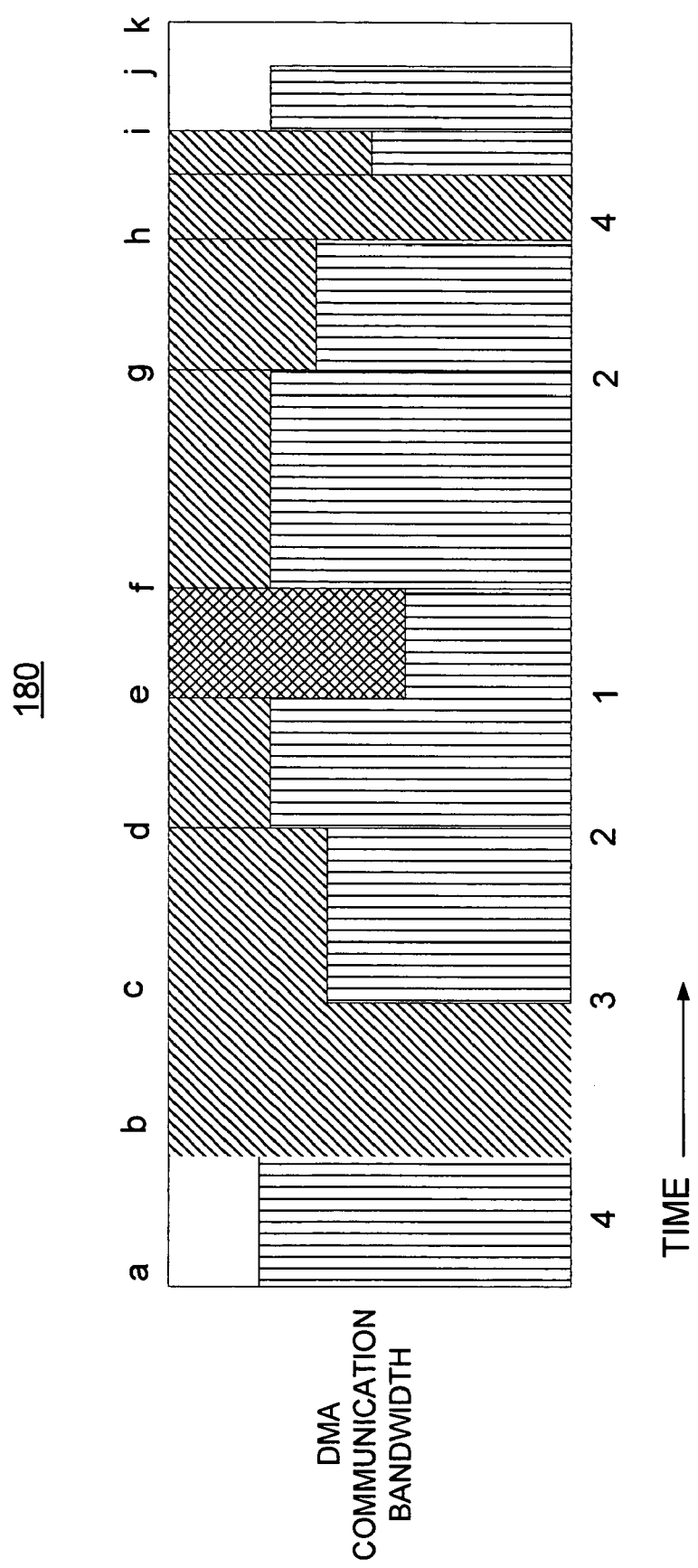
FIG. 3 is an illustration of an exemplary DMA communication bandwidth allocation plotted against time in accordance with one or more embodiments of the present invention.

FIG. 3 is an exemplary graph 180 of DMA communication bandwidth allocation plotted against time in accordance with one or more embodiments of the present invention. In this example, the letters at the top of the graph 180 represent various points in time along the bandwidth allocation graph 180. The numbers at the bottom of graph 180 correspond to defined-content DMA communication priority levels. DMA communication allocated to a defined content DMA communication task from data transfer device 112 is represented by regions having vertical lines therein. The regions with diagonal hatch marks represent DMA communication allocated to ongoing CPU operation. The cross-hatched region represents CPU 102 emergency DMA communication.

At left, at time "a", the defined-content DMA communication task (for brevity in this example, "DC DMA task") priority is at 4. However, with CPU 102 not contending for bandwidth, all of the bandwidth is available to the DC DMA task. At time "b", CPU 102 issues a request for DMA communication having a priority level of 2, which supersedes the DC DMA task priority level, thereby enabling the CPU 102 operation DMA task to use all the DMA communication bandwidth between times "b" and "c".

Continuing with the example, at around time "c", the advancement of time causes the DC DMA task's priority level to rise to 3, thereby shifting some bandwidth thereto for concurrent sharing of bandwidth between times "c" and "d". At time "d", the advancement of time causes the priority level of the DC MDA task to rise again, to 2, thereby shifting still more bandwidth thereto. Indeed, fractional concurrent shares of bandwidth are allocated between the DC DMA task and the CPU 102 DMA communication task.

Continuing with the example, at around time "e", the priority level of the DC DMA task rises to 1 due to the advancement of time. However, at about the same time, emergency DMA for CPU 102 is requested which also has a priority level 1. Accordingly, the DMA communication bandwidth is concurrently shared substantially equally between the two competing DMA communication tasks for the period between times "e" and "f".

Continuing with the example, at time "f", the emergency DMA of CPU 102 concludes, and the bandwidth share of the DC DMA task rises again while sharing the bandwidth with the CPU 102 DMA communication task at the same time. As progress is made toward completing the DC DMA task, its priority level gradually declines to 2 at time "g" and to 4 at time "h". It may be seen that the DC DMA task's share of bandwidth declines with each such decline in priority level. In fact, at time "h", the time remaining until the real-time deadline for completion of the DC DMA task is sufficiently high that its bandwidth share declines to 0 for a brief period, after time "h".

As demand for CPU 102 DMA communication bandwidth declines, and then concludes, at time "i", the DC DMA task's bandwidth share increases while concurrently sharing the bandwidth with the CPU 102 DMA communication task until the CPU 102 DMA communication task concludes. Between times "i" and "j", the DC DMA task is able to use all the DMA communication bandwidth it can. At time "j", the DC DMA task's DMA communication concludes.

In the above example, the unpredictable and variable needs of CPU 102 DMA communication, including emergency DMA communication were serviced, while still enabling the defined-content DMA task to be completed prior to its real-time deadline, indicated by time "k".

Priority Level Assignment

Priority level assignment circuits (PLACs) 122 and 124 were introduced in the discussion of FIG. 2. The following discussion, including that directed to FIGS. 4-6, is directed to selected embodiments for implementing circuits 122 and 124. However, it will be appreciated that the present invention is not limited to the embodiments of circuits 122 and 124 shown in FIGS. 4-6 and discussed in this disclosure.

In one or more embodiments, the algorithms for determining the priority levels of defined-content DMA communication tasks determine the pertinent priority levels based on input data that may include the amount of processing work remaining before completion of the pertinent communication, which is referred to herein simply as "processing time" 202. The input data for the priority level determination may also include the operating time margin 206 which preferably equals the amount of time remaining before the expiration of the real-time deadline for completing the defined-content DMA communication task minus the processing time 202 (that is, undisturbed DMA communication time) needed to conclude the defined-content DMA communication task. In one or more embodiments, additional data inputs may be used to determine the priority level for defined-content DMA communication.

Figure 4:
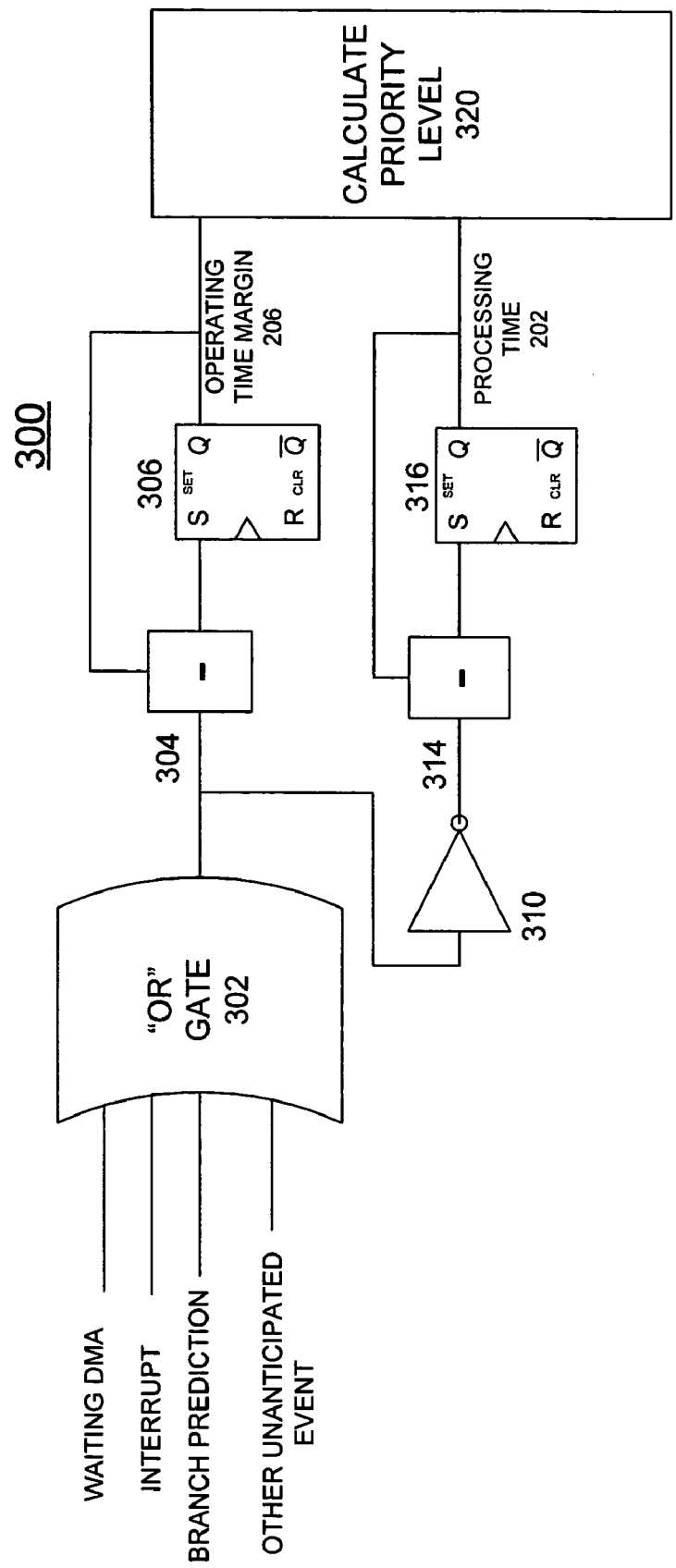
FIG. 4 is a block diagram of a circuit for determining a priority level of a defined-content DMA communication task in accordance with one or more embodiments of the present invention.

FIG. 4 is a block diagram of a circuit 300 for determining a priority level of a defined-content data communication task in accordance with one or more embodiments of the present invention.

Priority level determination circuit 300 may include "OR" gate 302 having a plurality of inputs, as indicated, inverter 310, subtraction circuits 304 and 314, flip-flop latches 306 and 316 and priority level calculation circuit 320.

Multiple input OR gate 302, inverter 310, subtraction circuits 304, 314, and flip flop latches 306 and 316 may be implemented by one or more digital logic gates, which are known to those of skill in the art. Accordingly, no further discussion of the construction of these components is provided herein.

Priority level calculation circuit 320 may be implemented using a processor running suitable software, in hardware, or using a combination of hardware and software. Moreover, a range of different algorithms could be used to determine the priority level to be accorded to defined-content DMA communication task by circuit 320, as a function of operating time margin 206 and processing time 202. In the following, algorithms and circuits in accordance with one or more embodiments of the present invention are described. However, the present invention is not limited to the specific algorithms and algorithm implementation means disclosed herein.

In one or more embodiments the following formulae may be employed to determine priority levels 1 through 4 as a function of processing time 202, operating time margin 206, and processing time constant 210. It is noted that processing time constant 1 210 is treated a single entity in FIG. 6, as only one value is shown therein. However, the following equations employ three separate processing time constant values. Moreover, in other embodiments, fewer or more than three processing time constant values may be employed and all such variations are intended to be included within the scope of the present invention.

In one or more embodiments, the priority level for a defined-content DMA communication task may be determined according to the following algorithm. In the table below, the arithmetic operations and expressions of relation (such as "equal", "less than", and "greater than" are spelled out in capitals for greater clarity.

TABLE I

| Condition | Priority Level |
|---|---|
| Operating time margin MINUS Estimated delay time 1 is LESS THAN Processing time | 1 |
| If the priority level 1 condition is not satisfied, AND Operating time margin MINUS Estimated delay time 2 is LESS THAN Processing time: | 2 |
| If conditions for priority levels 1 and 2 are not satisfied, AND Operating time margin MINUS Estimated delay time 3 is LESS THAN Processing time MULTIPLIED BY 1.5: | 3 |
| Where conditions for priority levels 1, 2, and 3 are not satisfied: | 4 |

In one or more embodiments, the three separate estimated delay time values, (numbered with suffix numerals "1", "2", and "3") referred to in Table I above, are constants having units of time that may be determined empirically. In one or more embodiments, estimated delay time 3 may be greater than estimated delay time 2 which may be greater than estimated delay time 1. As indicated in the above table, each estimated delay time value may form part of the test for its corresponding priority level.

The following discussion is considered helpful in understanding the relation between the stated conditions and their corresponding priority levels in the table above.

In one or more embodiments, the value of the estimated delay times 210 (whether for testing for priority levels 1, 2, 3, 4, or still other priority level) may be based on an estimated amount of interference with the defined-content DMA communication task. The estimated delay times (with suffix number 1, 2, 3, or other number) may include delays imposed by factors independent of DMA communication, such as interrupt processing. In general, the greater the amount of expected or estimated interference with defined-content DMA communication, the greater the estimated delay time 210 will be.

In one or more embodiments, the greater the value of processing time 202 is in relation to the operating time margin 206, the higher the priority level may be. And, it is recalled here that the higher the suffix numeral of the estimated delay time (suffix numerals of 1, 2, and 3 are shown in Table I), the greater the value of the delay time is.

In one or more embodiments, where the processing time 202 is greater than the operating time margin 206 minus a relatively small delay time, such as estimated delay time 1, the processing time 202 is relatively large in relation to the operating margin, indicating the existence of some urgency, thereby imposing a priority level of 1.

It may be seen that in Table I, as the value of the estimated delay time increases (upon proceeding downward within Table I), the processing time 202 also decreases. This is the case since conditions for higher priority levels have not been satisfied, and the value that processing time 202 is greater than keeps declining with increasing values of estimated delay time. Accordingly, consistent with the introductory statement on this matter, the smaller the processing time 202 is, in relation to the operating time margin 206, the lower the priority level for the pertinent defined-content DMA communication task will be. It is further noted that, with other values held constant within Table 1, the priority level for a given value of the processing time 202 may increase as the value of the delay time declines.

Figure 6:
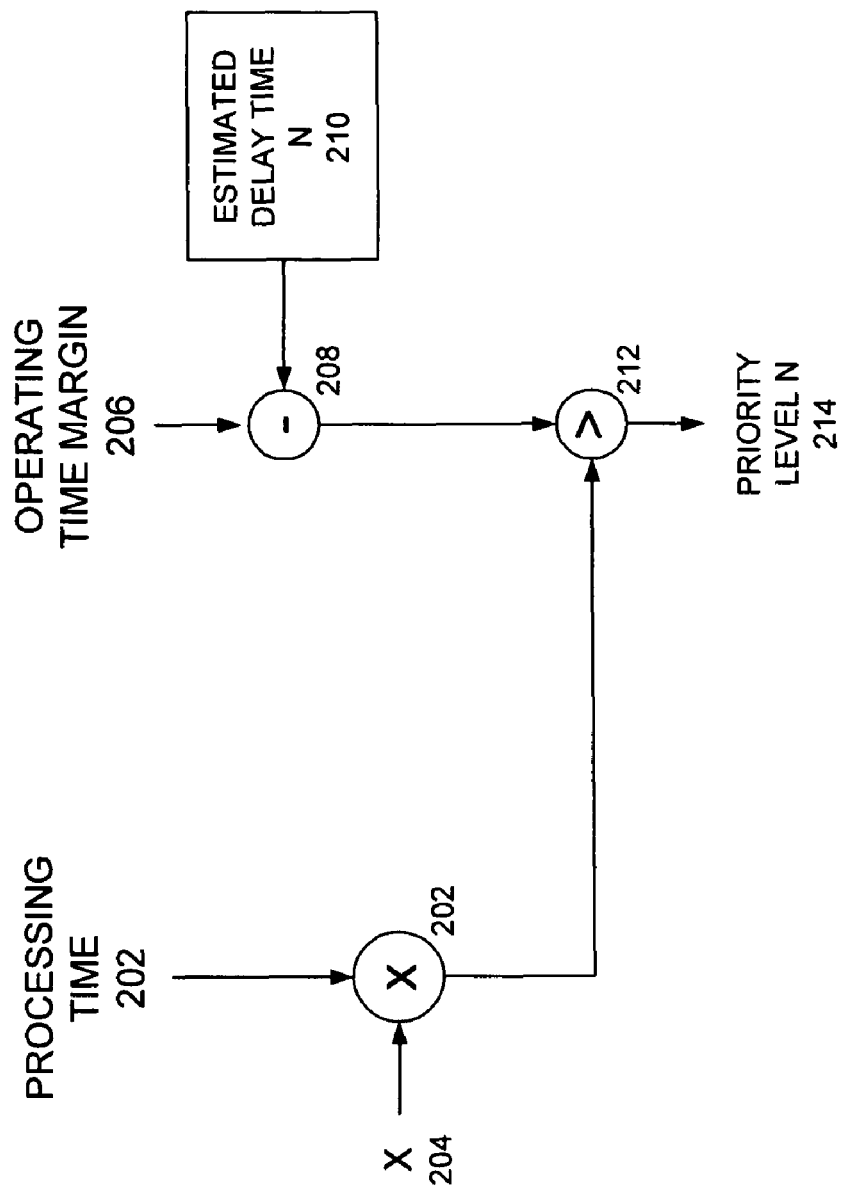
FIG. 6 is a schematic representation of a circuit for determining whether a particular priority level is applicable to a DMA communication task, in accordance with one or more embodiments of the present invention.

In one or more alternative embodiments, even if the estimated delay time remains constant, the priority level may vary as a function of the value of the multiplication factor 204 (FIG. 6). In Table 1, the condition associated with priority level 3 employs a multiplication factor of "1.5". However, multiplication factor values higher than or lower than this value may be employed. It may be seen that with other values in Table 1 held constant, the priority level of a task having a given processing time 202 may increase with increasing value of the multiplication factor 204.

In one or more embodiments, determination of the priority levels shown in Table I may be accomplished employing software, hardware, or a combination of both. An approach for determining a priority level, based on the data inputs provided in FIG. 4, is shown in FIG. 6 and discussed below. It will be appreciated that the present invention is not limited to the embodiment specified in the discussion of FIG. 6.

FIG. 6 is a schematic representation of a circuit 200 for determining whether a particular priority level is applicable to a DMA communication task, in accordance with one or more embodiments of the present invention. In one or more embodiments, a plurality of circuits 200 may be included within priority level calculation circuit 320 of FIGS. 4 and 5.

In one or more embodiments, circuit 200 may receive as data inputs processing time 202 and operating time margin 206, multiplication factor "X" 204, and estimated delay time N 210. Circuit 200 may include multiplication circuit 202, subtraction circuit 208, and comparator circuit or comparison circuit 212.

In one or more embodiments, the conditions associated with the four priority levels listed in Table I may be tested for using one or more circuits 200. The values of the estimated delay time 210, the priority level to be established, and the value of X 204 may be suitably adjusted based on the value of N employed within circuit 200.

Two examples are considered to illustrate the operation of circuit 200, for values of N=2 and 3. Where N=2, the value of X is 1, the delay time 210 is estimated delay time 2, and the priority level being tested for is, of course, priority level 2. Thus, since X=1, processing time 202 is compared to operating time margin 206 less estimated delay time 2. if the processing time 202 is greater than the result of the subtraction at subtraction circuit 212, priority level 2 is established for the pertinent defined-content DMA communication task.

In the exemplary case where N=3, the result of the processing time 202 multiplied by 1.5 (see Table I) is compared to the operating time margin 206 minus estimated delay time 3. If the product emerging from multiplication circuit 202 is greater than the result emerging from subtraction circuit 208, then priority level 3 is established. It is believed that the application of circuit 200 to other priority levels may be readily understood from the above discussion.

Having described the operation of priority level calculation circuit 320, attention is now directed to the operation of circuit 300 as a whole. The operation of circuit 300 is considered under the conditions where the output of OR gate 302 is low and where it is high.

The case where the OR gate 302 output is low is considered first. It may be seen that the OR gate 302-driven input to subtraction circuit 304 will be low. Thus, nothing will be subtracted from operating time margin 206.

Following another branch of circuit 300, the output of inverter 310 will be high. Accordingly, the value "1" is preferably subtracted from the pre-existing value of processing time 202 in subtraction circuit 314. Preferably, the reduced value of processing time 202 is then latched in flip-flop latch 316 and directed to calculation circuit 320. Thus, in this situation, processing time 202 may decline by one, and the operating time margin 206 may remain unchanged. This direction of change in the values of operating time margin 206 and processing 202 tends to reduce the level of urgency for the pertinent defined-content DMA communication. If this direction of change continues, one of the thresholds of Table I may be breached, and the applicable priority level may decrease by one level.

The case where the OR gate 302 output is high is now considered. The four recited events serving as inputs to OR gate 302 are activities of CPU 102 that may compete with a defined-content DMA communication task. The four events are considered self-explanatory and are therefore not discussed further in this disclosure.

In one or more embodiments, when the output of OR gate 302 is high, a value of "1" may be subtracted from operating time margin 206. Conversely, the OR gate 302 output, after being inverted in inverter 310 may be zero and may therefore not reduce the value of processing time 202. In this situation, an unchanged value of processing time 202 and the reduction in operating time margin 206 tends to increase the urgency of the defined-content DMA communication task. If the OR gate 302 output remains high for a sufficient number of cycles of circuit 300, the priority level calculated by circuit 320 will eventually rise, such as, for instance, by changing from priority level 2 to priority level 1. Herein, priority level "1" corresponds to a high level of priority and higher numeral values following the term "priority level" correspond to "lower" priority levels. Attention is now directed to FIG. 5 in which an alternative-embodiment priority level determination circuit is considered.

Figure 5:
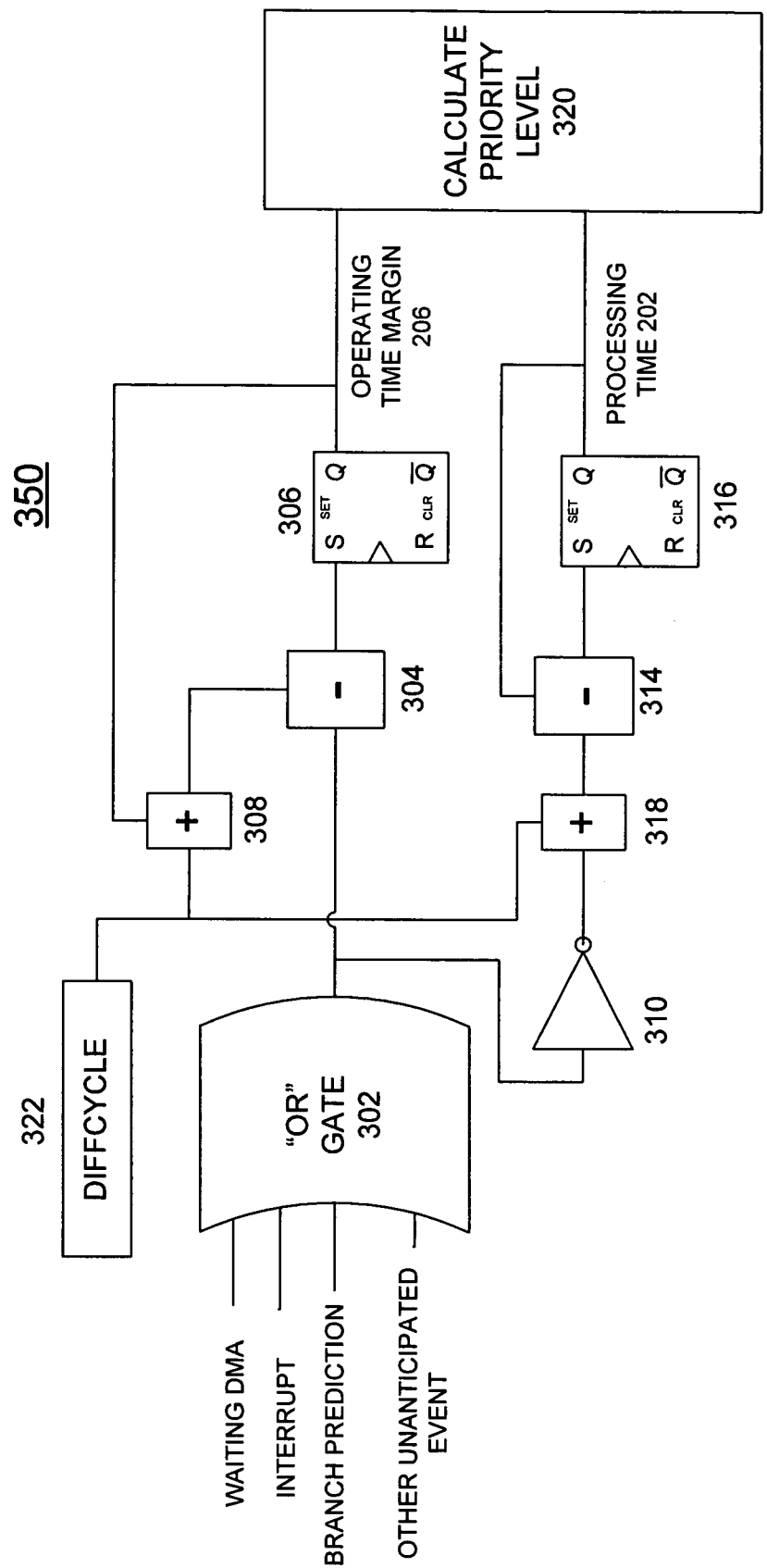
FIG. 5 is a block diagram of a circuit for determining a priority level of a defined-content DMA communication task in accordance with one or more alternative embodiments of the present invention.

FIG. 5 is a block diagram of a circuit 350 for determining a priority level of a defined-content DMA communication task in accordance with one or more alternative embodiments of the present invention.

The embodiment of FIG. 5 may differ from that of FIG. 4 primarily with respect to the introduction of the quantity DIFFCYCLE 322. The remainder of the functional blocks shown in FIG. 5 are essentially the same as those shown in FIG. 4. Thus, to avoid repetition, the blocks in common between the two embodiments will not be discussed in detail herein.

In one or more embodiments, an initial estimate of the processing time 202 needed to complete a defined-content DMA communication task may be based on the total amount of data to be transferred and on an initially estimated worst-case, or at least computationally expensive, scenario regarding the type of data to be transferred. For example, the processing time 202 needed to transfer an MPEG (Moving Picture Experts Group) stream decoder may vary depending upon whether or not the pertinent data includes a motion vector. In this case, the estimated processing time 202 may be determined on the assumption that the motion vector is present.

In one or more embodiments, determining that the type of defined-content data to be transferred is less demanding than the initially estimated worst case, or computationally expensive, scenario may enable one or more embodiments of the present invention to assign a lower priority level to the pertinent defined-content DMA communication task than would be assigned to the initially estimated scenario. Preferably, the extent of the disparity between the actual processing time 202 requirement and the initially estimated requirement can be quantified and used to adjust the values of the processing time 202 and the operating time margin 206.

In one or more embodiments, a beneficial disparity between the initially estimated processing time 202 and an actual or at least more accurate estimated processing time 202 may be obtained by first obtaining the initially estimated estimate for the processing time 202 for a given defined-content DMA communication task. This data may be obtained by a selected processor requesting the defined-content DMA communication task, or by a processor which is at least in communication with hardware conducting this communication task.

Thereafter, the selected processor may determine the amount of time needed to transfer a representative portion of the pertinent defined-content DMA communication task. From this determination, the selected processor may then calculate the total amount of processing time 202 needed to conduct the pertinent defined-content DMA communication task. The selected processor may then subtract the calculated actual processing time from the initially estimated processing time to obtain the time disparity between these two values, which disparity is illustrated in FIG. 5 as "DIFFCYCLE 322". The value of DIFFCYCLE 322 may be stored with, or in a location suitably linked to, commands or data associated with the defined-content DMA communication task that it pertains to.

In one or more embodiments, the operating time margin 206 and processing time 202 initially latched as the outputs of flip-flop latches 306 and 316, respectively, may be calculated in accordance with the initially estimated processing-time scenario for a given defined-content DMA communication task. Thereafter, if it is determined that a proposed defined-content DMA communication task does not correspond to the initially-estimated computationally expensive scenario, the diffcycle 322 value may be determined in the manner described above.

In one or more embodiments, circuit 350 of FIG. 5 may operate substantially the same way as circuit 300 of FIG. 4, particularly in the absence of a known value for diffcycle 322. Since the function of the embodiment of FIG. 4 was discussed above, the aspects of FIG. 5 in common with those of FIG. 4 are not discussed in detail in this section.

The determination of a disparity between the actual and worst-case values of processing time 202 may not be known when circuit 350 begins processing a defined-content DMA communication task. Thus, at least for a finite number of cycles, circuit 350 may operate in accordance with the above-described function of circuit 300 of FIG. 4.

In one or more embodiments, a selected processor or other suitable computing device, in communication with circuit 350, may determine that the above-discussed processing time disparity exists. Thereafter, the selected processor may calculate the value of the disparity, which is referred to as diffcycle 322 herein. The diffcycle 322 value may be suitably stored so as to be accessible to circuit 350 as needed.

In one or more embodiments, once the diffcycle 322 value is known, it may be transmitted to addition circuits 308 and 318 to suitably adjust the values of the operating time margin 206 and the processing time 202. In one or more embodiments, the addition of the diffcycle 322 value at circuits 308 and 318 may occur just once. However, in one or more alternative embodiments, further adjustments to the values of the operating time margin 206 and the processing time 202 may be made by conducting further addition operations at circuits 308 and 318, respectively. Such further adjustments may be made, for example, in response to the acquisition of still more accurate data regarding the actual value of the processing time 202.

The effect of adding the diffcycle 322 value at addition circuits 308 and 318 is now examined in greater detail. Adding diffcycle 322 at addition circuit 308 may operate to increase the value of the operating time margin 206 by the value of diffcycle. This addition may occur just once during a given defined-content DMA communication task. Increasing the magnitude of the operating time margin 206 in this manner tends to decrease the urgency of the in-progress defined-content DMA communication task.

We now direct attention to the addition at addition circuit 318. In this case, diffcycle 322 is added the quantity emerging from inverter 310, and the resulting sum of these may be subtracted from the prior cycle's value of processing time 202 at circuit 314 to produce an updated value thereof. Thus, the value of diffcycle 322 is effectively subtracted from the prior value of processing time 202. This reduction in magnitude of the processing time 202 tends to reduce the urgency associated with the in-progress defined-content DMA communication task.

It is noted that the additions at circuits 308 and 318 may operate, respectively, to increase the operating time margin 206 and to decrease the processing time 202, both of which changes tend to work toward reducing the priority level of the in-progress DMA communication task. Accordingly, it may be seen that in one or more embodiments, the effect of introducing a value of diffcycle 322 into the circuit of FIG. 5 has a dual impact on the calculation for determining the priority level using the algorithms implemented within circuit 320.

As with the addition at circuit 308, the addition of the diffcycle 322 value at addition circuit 318 may be a one-time event. However, in one or more alternative embodiments, further additions at circuit 318 may take place.

An example is considered in which the diffcycle 322 value is added more than once. This is effectively the same as saying that diffcycle 322 has a non-zero value for two different clock cycles during the progress of a defined-content DMA communication task within circuit 350. The following exemplary string of diffcycle 322 values at a series of clock cycles is considered: 1) 0 2) 0, 3) 0, 4) 0, 5) 0, 6) 100, 7) 0, 8) 0, 9) 0, 10) 200, 11) 0, and 12) 0. It may be seen that diffcycle 322 has a value of "0" for all of the listed clock cycles except for clock cycles 6) and 10).

At clock cycle 6, it may be determined that the time required to process the ongoing defined-content DMA communication task differs from the worst case estimate by 100 cycles. Thus, the various arithmetic operations in circuit 350 involving diffcycle 322 may be conducted using the diffcycle value of 100. Thereafter, the diffcycle 322 value is zero again for several cycles. However, at clock cycle 10, it may be determined that the ongoing defined-content DMA communication task differs from the worst case estimate by another 200 clock cycles. Accordingly, the arithmetic operations in circuit 350 employing diffcycle 322 may be conducted again, this time employing a diffcycle value of 200 cycles. Thus, in this example, after the arithmetic operations of clock cycles 6 and 10 have concluded, the processing time 202 may have been reduced by 300 cycles with respect to the initial worst-case estimate. Correspondingly, the operating time margin 206 may have increased by 300 cycles with respect to the initial worst-case estimate.

In one or more alternative embodiments, the approach described above in connection with FIG. 5 may be reversed. Specifically, in one or more alternative embodiments, priority level determination circuit 350 may start by using values of operating time margin 206 and processing time 202 that correspond to an initially estimated best-case, or at least computationally inexpensive, scenario for the processing time 202 of a defined-content DMA communication task. Thereafter, a disparity between the initially estimated processing time 202 and the actual processing time 202 may be determined and stored. This disparity from the initially estimated case may be called "addcycle" and may be used in a manner analogous to that described above in connection with diffcycle 322.

In one or more embodiments, the addcycle value may be determined during the initial cycles of an in-progress defined-content DMA communication task. Thereafter, in order to correct for the disparity between the initially estimated computationally inexpensive case and the actual processing time 202, the addcycle value may be subtracted from the operating time value 206 and added to the processing time 202. The resulting effect may be to raise the priority level of the in-progress defined-content DMA communication task, as determined by circuit 320, which is consistent with the transition from an initially estimated computationally inexpensive scenario to a less optimistic, or more computationally expensive, assessment of the processing time 202.

As with the arithmetic operations involving diffcycle 322, the adjustments to the values of operating time margin 206 and processing time 202 by the value of "addcycle" are preferably conducted only once each during a given defined-content DMA communication task. However, in one or more alternative embodiments, plural adjustments to the values of operating time margin 206 and processing time 202 may be made, based on additional estimates of the actual processing time 202, or on other sources of data.

Figure 7:
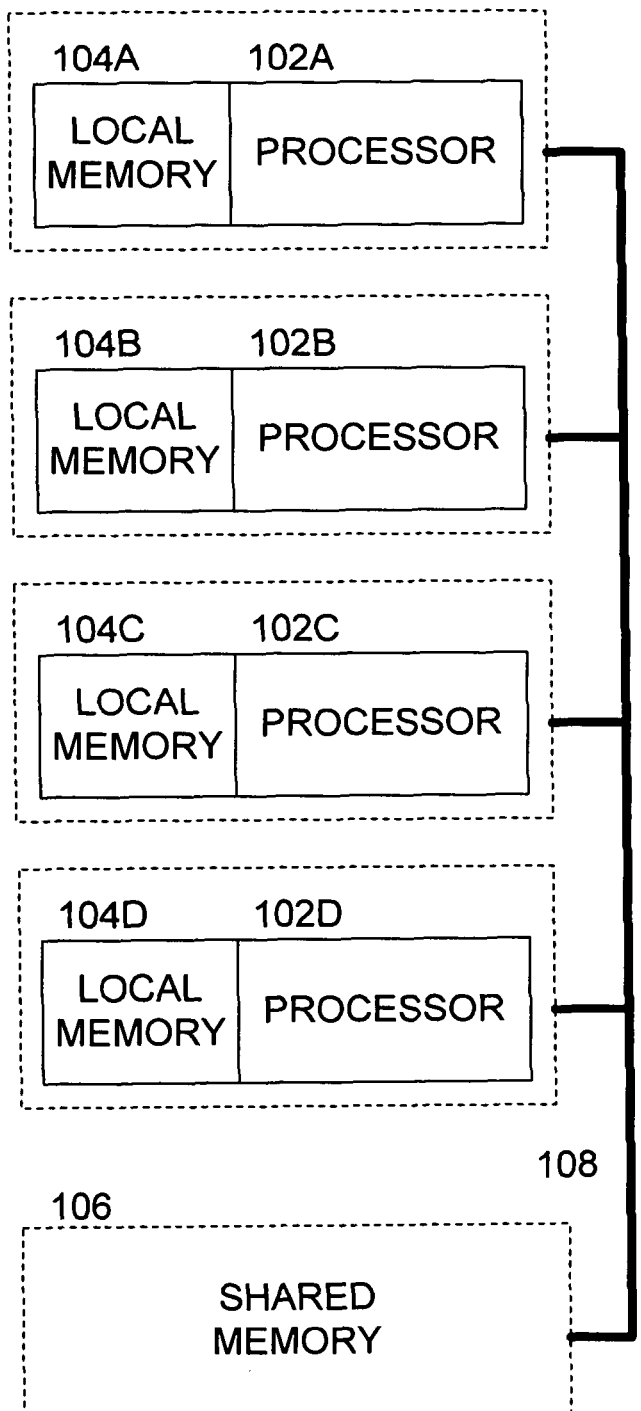
FIG. 7 is a diagram illustrating a multiprocessing system that may be adapted to utilize the clock signal selection apparatus and method discussed above in order to achieve one or more further embodiments of the present invention.

FIG. 7 is a block diagram of a multi-processing system 100A that may be adapted to implement the features discussed herein and one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. The methods and/or circuit functionality discussed above may also be applied to the circuit configuration of FIG. 7, where the processors 102 are the circuit blocks discussed above.

Although four processors 102 are illustrated by way of example, any number may be utilized without departing from the spirit and scope of the present invention. Each of the processors 102 may be of similar construction or of differing construction. The local memories 104 are preferably located on the same chip (same semiconductor substrate) as their respective processors 102; however, the local memories 104 are preferably not traditional hardware cache memories in that there are no on chip or off chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi processing computer system are constructed from a common computing module (or cell). This common computing module has a consistent structure and preferably employs the same instruction set architecture. The multi processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi processing computer system, and if a network is employed, the rapid transmission of applications and data over the network. This structure also simplifies the building of members of the network of various sizes and processing power and the preparation of applications for processing by these members.

Figure 8:
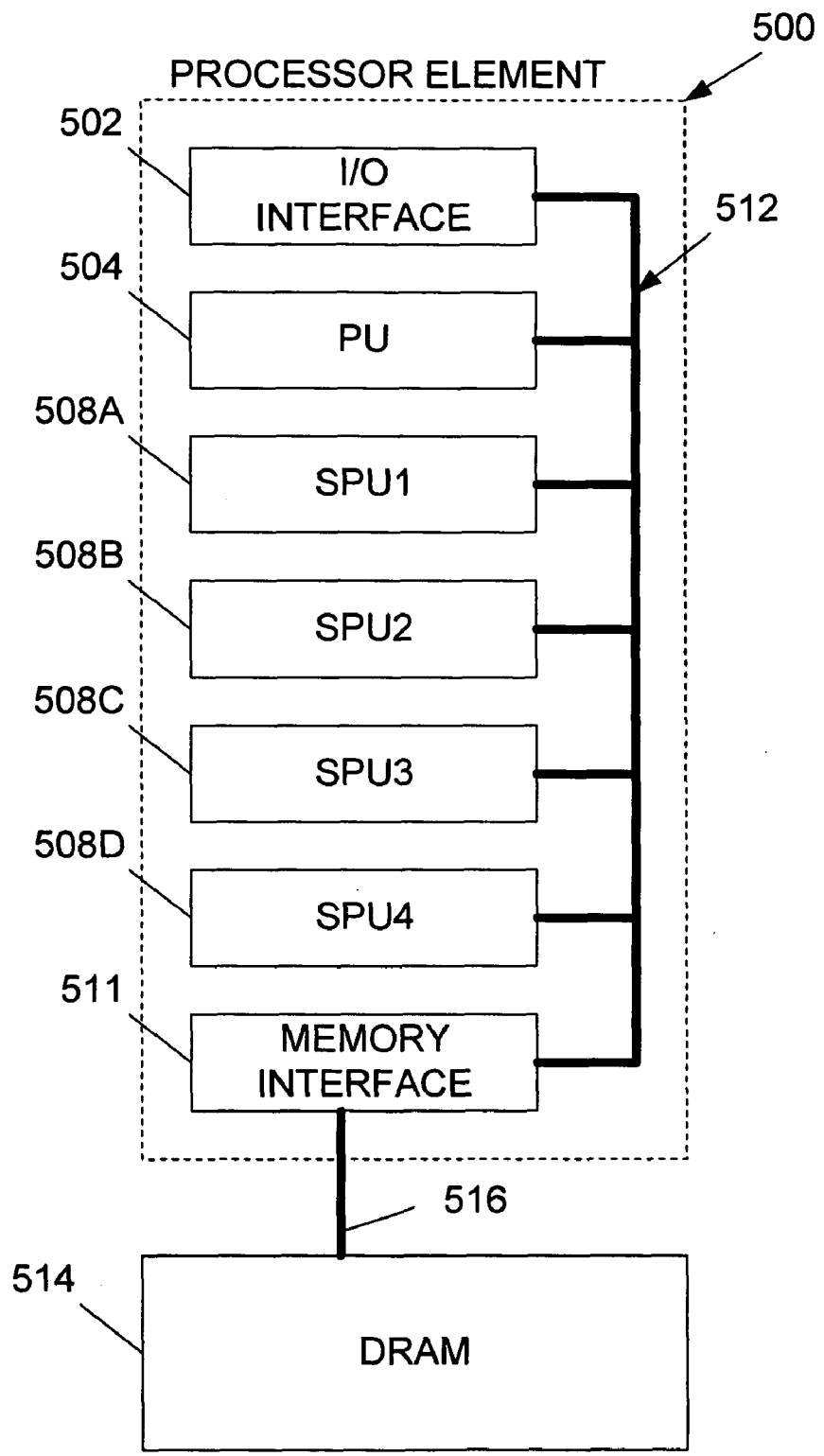
FIG. 8 is a diagram illustrating a processor element (PE) that may be used to implement one or more further aspects of the present invention.

With reference to FIG. 8, the basic processing module is a processor element (PE) 500. The PE 500 comprises an I/O interface 502, a processing unit (PU) 504, and a plurality of sub processing units 508, namely, sub processing unit 508A, sub processing unit 508B, sub processing unit 508C, and sub processing unit 508D. A local (or internal) PE bus 512 transmits data and applications among the PU 504, the sub processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so called III B compounds employing a wide variety of dopants. The PE 500 also may be implemented using superconducting material, e.g., rapid single flux quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub processing units 508 and the PU 504 of the PE 500. It is noted that the DMAC and/or the memory interface 511 may be integrally or separately disposed with respect to the sub processing units 508 and the PU 504. Indeed, the DMAC function and/or the memory interface 511 function may be integral with one or more (preferably all) of the sub processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand alone processing of data and applications. In operation, the PU 504 preferably schedules and orchestrates the processing of data and applications by the sub processing units. The sub processing units preferably are single instruction, multiple data (SIMD) processors. Under the control of the PU 504, the sub processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub processing units 508 taking on the role of a main processing unit that schedules and orchestrates the processing of data and applications by the sub processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub processing units of a PE 500 assigned to processing a particular software cell depends upon the complexity and magnitude of the programs and data within the cell.

Figure 9:
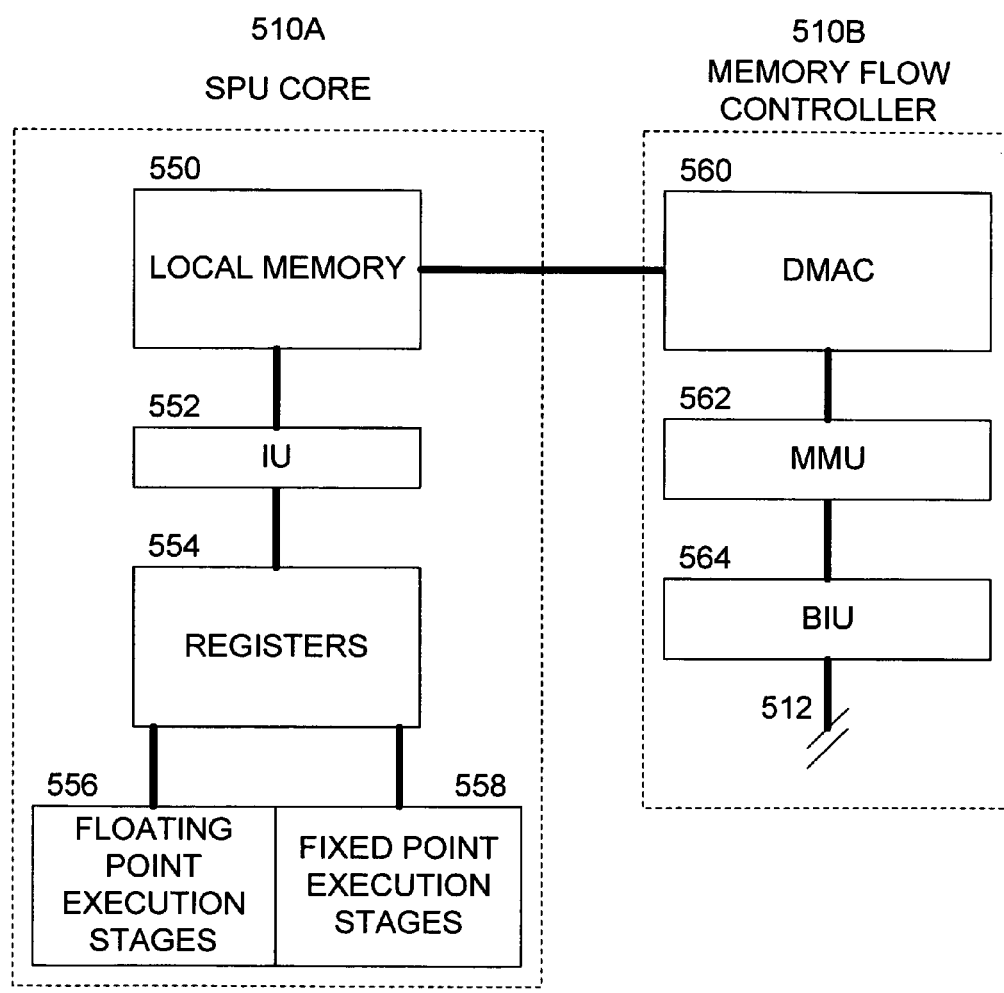
FIG. 9 is a diagram illustrating the structure of an exemplary sub processing unit (SPU) of the system of FIG. 8 that may be adapted in accordance with one or more further aspects of the present invention.

FIG. 9 illustrates the preferred structure and function of a sub processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 510A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide 264 bytes of effective address space with 4K-, 64K-, 1M-, and 16M-byte page sizes and 256 MB segment sizes. Preferably, the MMU 562 is operable to support up to 265 bytes of virtual memory, and 242 bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 10:
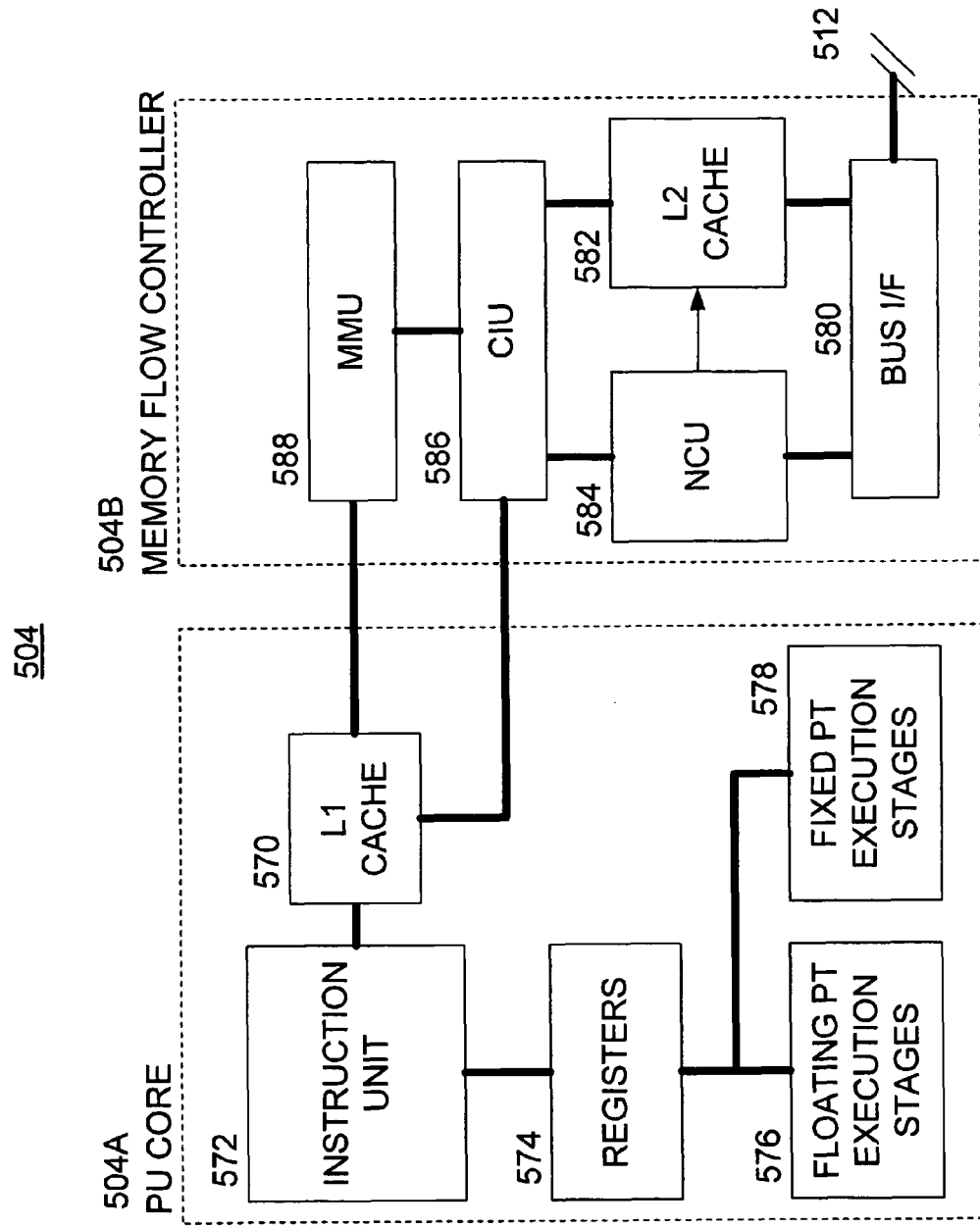
FIG. 10 is a diagram illustrating the structure of an exemplary processing unit (PU) of the system of FIG. 6 that may be adapted in accordance with one or more further aspects of the present invention.

FIG. 10 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queuing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An Apparatus, comprising:
  a processor operable to request a processor operation Direct Memory Access ("DMA") communication task;
  at least one data transfer device operable to request a defined-content DMA communication task;

a memory operable to enable DMA communication with the processor and the at least one data transfer device over at least one data bus, the DMA communication having a bandwidth; and an arbitration system operating to allocate fractional concurrent shares of the DMA communication bandwidth such that the processor operation DMA communication task and the at least one defined-content DMA communication task access their respective fractional concurrent shares of the DMA communication bandwidth at the same time wherein the arbitration system includes a priority level determination circuit operable to assign one of a plurality of priority levels to each said defined-content DMA communication task, and the priority level determination circuit comprises:

(a) a circuit for updating an operating time margin for one said defined-content DMA communication task;

(b) a circuit for updating a remaining processing time for said defined-content DMA communication task; and (c) a priority level calculation circuit for determining a priority level based on outputs of the circuits of (a) and (b); and wherein the apparatus is operable to:

determine a disparity between an initially estimated computationally expensive processing time and an actual processing time for the defined-content DMA communication task;

add the determined disparity to the updated operating time margin;

subtract the determined disparity from the updated remaining processing time; and update the priority level for the defined-content DMA communication task based on the adding and subtracting steps.

2. The apparatus of claim 1 wherein the apparatus comprises a multiprocessor system including the processor and the at least one data transfer device.

3. The apparatus of claim 1 wherein the memory is a DRAM (Dynamic Random Access Memory).

4. The apparatus of claim 1 wherein the at least one data bus is coupled to the processor and to the at least one data transfer device.

5. The apparatus of claim 1 wherein the at least one data bus comprises:

a first data bus coupled to the processor and at least one additional data bus coupled to the at least one data transfer device.

6. The apparatus of claim 1 further comprising: a multiple priority level bandwidth sharing system for allocating the DMA bandwidth between the processor operation DMA communication task and the at least one defined-content DMA communication task for each said priority level.

7. The apparatus of claim 6 wherein the multiple priority level bandwidth sharing system comprises a bandwidth sharing circuit for each said priority level.

8. An Apparatus, comprising:

a processor operable to request a processor operation Direct Memory Access ("DMA") communication task;

at least one data transfer device operable to request a defined-content DMA communication task;

a memory operable to enable DMA communication with the processor and the at least one data transfer device over at least one data bus, the DMA communication having a bandwidth; and an arbitration system operating to allocate fractional concurrent shares of the DMA communication bandwidth such that the processor operation DMA communication task and the at least one defined-content DMA communication task access their respective fractional concurrent shares of the DMA communication bandwidth at the same time wherein the arbitration system includes a priority level determination circuit operable to assign one of a plurality of priority levels to each said defined-content DMA communication task, and the priority level determination circuit comprises:

(a) a circuit for updating an operating time margin for one said defined-content DMA communication task;

(b) a circuit for updating a remaining processing time for said defined-content DMA communication task; and (c) a priority level calculation circuit for determining a priority level based on outputs of the circuits of (a) and (b); and wherein the apparatus is operable to:

determine a disparity between an initially estimated computationally inexpensive processing time and an actual processing time for the defined-content DMA communication task;

subtract the determined disparity from the updated operating time margin;

add the determined disparity to the updated remaining processing time; and update the priority level for the defined-content DMA communication task based on the subtracting and adding steps.

9. A method, comprising:

providing a processor, operable to request an ongoing processor operation Direct Memory Access ("DMA") communication task;

providing at least one data transfer device operable to request a defined-content DMA communication task;

providing a memory operable to conduct DMA communication with the processor and the at least one data transfer device over at least one data bus, the DMA communication having a bandwidth; and allocating fractional concurrent shares of the DMA communication bandwidth such that the processor operation DMA communication task and the defined-content DMA communication task access their respective fractional concurrent shares of the DMA communication bandwidth at the same time, wherein the allocating step comprises:

establishing a plurality of priority levels for the DMA communication with the memory;

assigning a priority level to the processor operation DMA communication task;

assigning a priority level to the defined-content DMA communication task by: (a) updating an operating time margin for the defined-content DMA communication task, (b) updating a remaining processing time for the defined-content DMA communication task, and (c) determining a priority level for the defined-content DMA communication task based on the results of steps (a) and (b); and sharing the DMA bandwidth within each said priority level between DMA communication tasks at each said priority level;

determining a disparity between an initially estimated computationally expensive processing time and an actual processing time for the defined-content DMA communication task;

adding the determined disparity to the updated operating time margin;

subtracting the determined disparity from the updated remaining processing time; and updating the priority level for the defined-content DMA communication task based on the adding and subtracting steps.

10. The method of claim 9 wherein the allocating step comprises: allocating the DMA communication bandwidth between the processor operation DMA communication task and the at least one defined-content DMA communication task based on respective priority levels thereof.

11. The method of claim 9 wherein the allocating step comprises:

determining a priority level of one said defined-content DMA communication task;

determining a priority level of the processor operation DMA communication task; and allocating the DMA communication bandwidth to the task having the higher priority level, if the determined priority levels are different.

12. The method of claim 11 wherein the allocating step further comprises: sharing the DMA communication bandwidth among the DMA communication tasks, if the determined priority levels are equal.

13. The method of claim 12 wherein the sharing step comprises: sharing the DMA communication bandwidth either one of equally or unequally between the DMA communication tasks having said equal priority levels.

14. The method of claim 9 wherein the allocating step further comprises:

starting the sharing step at a highest of the priority levels;

transitioning to a next lowest one of the priority levels; and sharing the DMA communication bandwidth among the DMA communication tasks at the next lowest priority level.

15. The method of claim 14 wherein the allocating step further comprises:

repeating the transitioning and sharing steps for all of the priority levels in order of declining priority level; and transitioning back to the highest one of the priority levels.

16. A method, comprising:

providing a processor, operable to request an ongoing processor operation Direct Memory Access ("DMA") communication task;

providing at least one data transfer device operable to request a defined-content DMA communication task;

providing a memory operable to conduct DMA communication with the processor and the at least one data transfer device over at least one data bus, the DMA communication having a bandwidth; and allocating fractional concurrent shares of the DMA communication bandwidth such that the processor operation DMA communication task and the defined-content DMA communication task access their respective fractional concurrent shares of the DMA communication bandwidth at the same time, wherein the allocating step comprises:

establishing a plurality of priority levels for the DMA communication with the memory;

assigning a priority level to the processor operation DMA communication task;

assigning a priority level to the defined-content DMA communication task by: (a) updating an operating time margin for the defined-content DMA communication task, (b) updating a remaining processing time for the defined-content DMA communication task, and (c) determining a priority level for the defined-content DMA communication task based on the results of steps (a) and (b); and sharing the DMA bandwidth within each said priority level between DMA communication tasks at each said priority level;

determining a disparity between an initially estimated computationally expensive processing time and an actual processing time for the defined-content DMA communication task;

subtracting the determined disparity from the updated operating time margin;

adding the determined disparity to the updated remaining processing time; and updating the priority level for the defined-content DMA communication task based on the subtracting and adding steps.

17. The apparatus of claim 1, wherein the arbitration system is operable to allocate the fractional shares of the DMA communication bandwidth between the processor operation DMA communication task and the at least one defined-content DMA communication task when such tasks have equal priority levels.

18. An Apparatus, comprising:

a processor operable to request a processor operation Direct Memory Access ("DMA") communication task;

at least one data transfer device operable to request a defined-content DMA communication task;

a memory operable to enable DMA communication with the processor and the at least one data transfer device over at least one data bus, the DMA communication having a bandwidth; and an arbitration system operable to allocate the DMA communication bandwidth between the processor operation DMA communication task and the at least one defined-content DMA communication task, wherein the arbitration system comprises a priority level determination circuit operable to assign one of a plurality of priority levels to each said defined-content DMA communication task, the priority level determination circuit comprises:

(a) a circuit for updating an operating time margin for one said defined-content DMA communication task;

(b) a circuit for updating a remaining processing time for said defined-content DMA communication task; and (c) a priority level calculation circuit for determining a priority level based on outputs of the circuits of (a) and (b), and the apparatus is operable to determine a disparity between an initially estimated computationally expensive processing time and an actual processing time for the defined-content DMA communication task; add the determined disparity to the updated operating time margin; subtract the determined disparity from the updated remaining processing time; and update the priority level for the defined-content DMA communication task based on the adding and subtracting steps.

19. A method, comprising:

providing a processor, operable to request an ongoing processor operation Direct Memory Access ("DMA") communication task;

providing at least one data transfer device operable to request a defined-content DMA communication task;

providing a memory operable to conduct DMA communication with the processor and the at least one data transfer device over at least one data bus, the DMA communication having a bandwidth;

allocating the DMA communication bandwidth between the processor operation DMA communication task and the defined-content DMA communication task, wherein the allocating step comprises:

establishing a plurality of priority levels for the DMA communication with the memory;

assigning a priority level to the processor operation DMA communication task;

assigning a priority level to the defined-content DMA communication task, wherein the step of assigning a priority level to the defined-content DMA communication task comprises: (a) updating an operating time margin for the defined-content DMA communication task; (b) updating a remaining processing time for the defined-content DMA communication task; and (c) determining a priority level for the defined-content DMA communication task based on the results of steps (a) and (b); and sharing the DMA bandwidth within each said priority level between DMA communication tasks at each said priority level;

determining a disparity between an initially estimated computationally expensive processing time and an actual processing time for the defined-content DMA communication task;

adding the determined disparity to the updated operating time margin;

subtracting the determined disparity from the updated remaining processing time; and updating the priority level for the defined-content DMA communication task based on the adding and subtracting steps.

* * * * *